United States Patent [19]

deFries

[11] 4,080,877

[45] Mar. 28, 1978

[54] WORKING CYLINDER FOR PNEUMATIC OR HYDRAULIC PRESSURE MEDIA

[76] Inventor: Jan Richard deFries, Hirschwiesenstrasse 9, Zurich, Switzerland

[21] Appl. No.: 620,283

[22] Filed: Oct. 6, 1975

[30] Foreign Application Priority Data

Oct. 9, 1974 Germany ............................ 2448028

[51] Int. Cl.[2] ............................ F01B 1/00; F16J 1/00

[52] U.S. Cl. .......................................... 92/61; 92/146; 92/169; 92/177

[58] Field of Search ................. 92/146, 169, 177, 161, 92/61, 73; 206/821

[56] References Cited

U.S. PATENT DOCUMENTS

| | | | |
|---|---|---|---|
| 992,424 | 5/1911 | Huggins | 92/161 X |
| 3,005,669 | 10/1961 | Nunnemacher | 92/161 |
| 3,136,225 | 6/1964 | Rader | 92/164 |
| 3,180,236 | 4/1965 | Beckett | 92/177 X |
| 3,589,387 | 6/1971 | Raymond | 251/367 X |
| 3,759,146 | 9/1973 | Brotherton | 92/169 X |
| 3,815,480 | 6/1974 | Spyra | 92/177 X |
| 3,893,378 | 7/1975 | Hewitt | 92/169 X |

FOREIGN PATENT DOCUMENTS

| | | | |
|---|---|---|---|
| 869,585 | 3/1953 | Germany | 92/177 |

OTHER PUBLICATIONS

Miller, High Pressure Hydraulic Cylinders Catalogue Bulletin, H-104G, 5/3/54.

*Primary Examiner*—Irwin C. Cohen
*Attorney, Agent, or Firm*—Watson, Cole, Grindle & Watson

[57] ABSTRACT

A working cylinder for pneumatic or hydraulic pressure media has a piston reciprocable in a cylinder chamber closed at one end. The cylinder and the piston have polygonal cross-sections. The end of the cylinder may be closed by a cylinder cap secured in place by bolts passing through it and threaded in the ends of the cylinder. Polygonal seals are provided between the cylinder caps and the piston and the interior walls of the cylinder. Two opposed walls of the cylinder may be thicker than the outer walls, and provided with through holes for attachment means.

2 Claims, 6 Drawing Figures

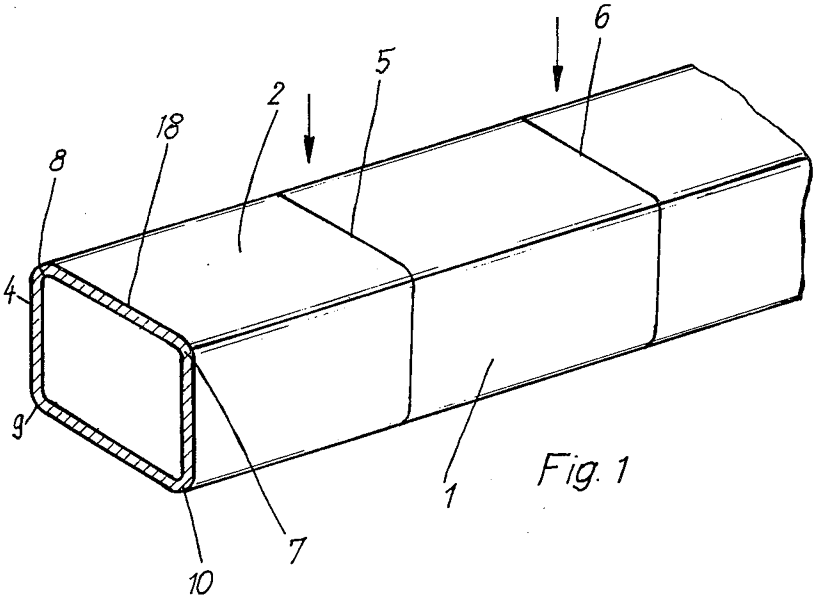
Fig. 1
Fig. 2
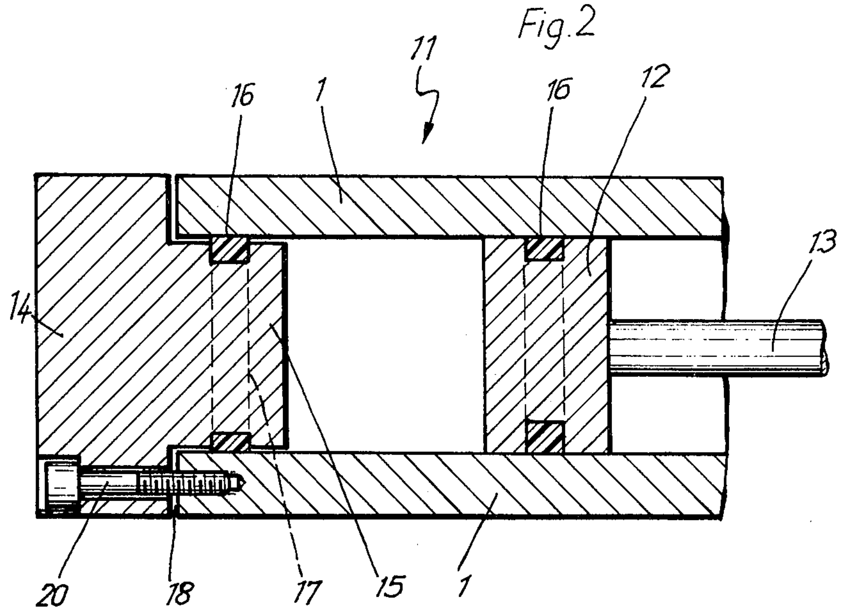

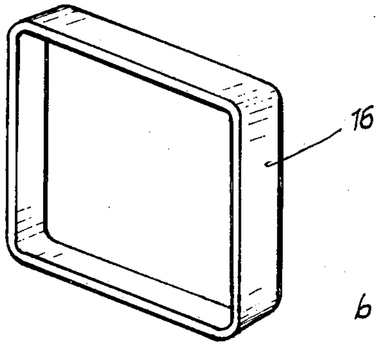
Fig. 3
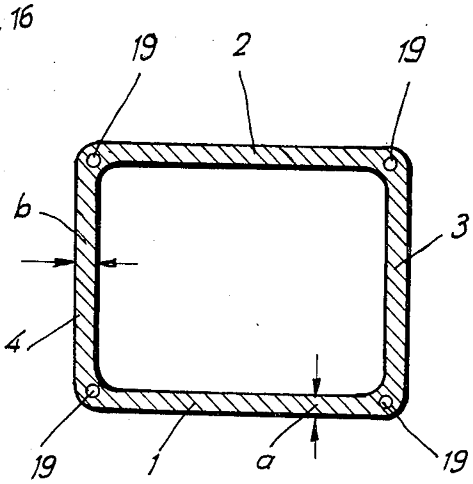
Fig. 4 a = b
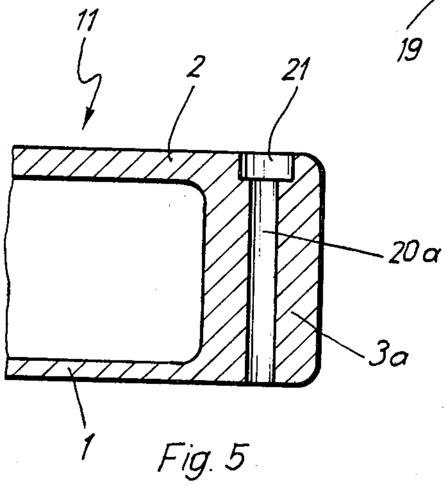
Fig. 5
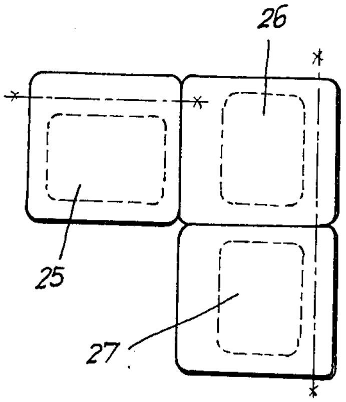
Fig. 6

WORKING CYLINDER FOR PNEUMATIC OR HYDRAULIC PRESSURE MEDIA

BACKGROUND OF THE INVENTION

1. Field of the Invention

The present invention relates to a working cylinder for pneumatic or hydraulic pressure media with a piston which can be moved to-and-fro in the longitudinal direction of the cylinder and is located in a cylinder chamber which is closed at the front ends.

2. The Prior Art

The chamber of known cylinders usually has a circular section as seen perpendicularly to its longitudinal axis. In such cylinders, the external cross-section is also correspondingly circular. The mounting of such cylinders presents difficulties. Frequently, the circular cylinder is provided with flange-type projecting parts formed onto the exterior for attachment purposes. In hydraulic or pneumatic arrangements in particular, it is frequently required for several cylinders to be arranged sidewise respectively next to or on top of each other. With circular cylinders, spaces which cannot be used occur between the individual cylinders.

SUMMARY OF THE INVENTION

To avoid the described disadvantages, the object of the invention is to create a cylinder of the type already specified which is constructed simply and can be attached without difficulty and which allows an arrangement of several cylinders next to or on top of each other in the smallest of space without unusable intermediate spaces.

According to the present invention, this object is solved in that the cylinder has a substantially polygonal hollow section with opposite longitudinal external sides being parallel, e.g. a rectangular hollow section or a square hollow section.

Polygonal hollow sections customary in the trade, such as drawn sections for example, can be used for the cylinder according to the present invention, without reworking. Because the longitudinal exterior sides are parallel to each other, the cylinder can be fastened to a flat base much more easily than is the case with circular cylinders since two flat surfaces are now in contact with each other. The requirement which was previously frequently necessary of forming flange-type attachments on the cylinder body can be omitted. Furthermore, the design can be made such that there are absolutely no projecting parts. Other advantages are the compact construction and the relatively large useful volume in relation to the space requirement, and also the very simple shape which additionally allows several similar cylinders to be grouped together in a package in a minimum of space. Quite apart from this, there is also the possibility of being able to fasten the cylinder in a simple manner without projecting or protruding parts being included. A particularly useful embodiment of the invention is that the cylinder consists of a portion of a drawn aluminium of quadrangular hollow section. Aluminium sections of this kind are available commercially in large lengths. To manufacture a cylinder according to the present invention, a length corresponding to the desired length of the cylinder can be separated or cut off from the rod-shaped section supplied. It is possible, therefore, to manufacture cylinders of different lengths by simple means without it being necessary for many blank pieces of corresponding lengths to be kept in stock. Furthermore, aluminium quadrangular hollow sections are available in the trade with such uniformity and quality of surface that no further surface treatment is necessary for its use as a cylinder.

BRIEF DESCRIPTION OF THE DRAWINGS

The present invention will now be described with reference to the forms of construction shown in the drawings. These show:

FIG. 1 a perspective diagram of an aluminium quadrangular hollow section which can be used for the manufacture of the cylinder according to the present invention, FIG. 2 a longitudinal section through a front part of one form of construction of the cylinder according to the present invention, as a partial view, FIG. 3 a perspective diagram of a quadrangular seal which can be used in conjunction with the cylinder according to the present invention, FIG. 4 a sectional view through a cylinder according to the present invention as viewed from the front side in the region of the front end of the face, FIG. 5 a sectional drawing corresponding to FIG. 4 but for another form of construction and as a partial view, and FIG. 6 a schematic diagram of a modification of the subject matter of the invention in which several cylinders are packaged, i.e. closely grouped together to form a unit.

DESCRIPTION OF THE PREFERRED EMBODIMENTS

FIG. 1 shows a quadrangular hollow section made of aluminium. As can be seen, the opposite longitudinal exterior sides 1 and 4, and 2 and 3 respectively, are parallel to each other, and the pairs of sides 1 and 2, 2 and 4, 4 and 3, and also 3 and 1 are at right-angles to each other. To make a cylinder in accordance with the present invention, a piece is first cut off the hollow section shown in FIG. 1 corresponding to the desired length of the cylinder body or barrel (without a cylinder cap), i.e. the quadrangular tube supplied as a large length is cut to length. Thus, it is possible for example to separate the hollow-section at the lines designated by 5 and 6 by known methods. As can be seen, the corners 7, 8, 9 and 10 in the form of construction shown are rounded both at the inner edges and at the outer edges. Naturally, the quadrangular tube used to manufacture the new cylinders can also be of another material than aluminium, e.g. another metal.

As can be seen from FIG. 2, a piston 12 which can be moved to-and-fro longitudinally and whose contour corresponds to the cross-section of the cylinder chamber is arranged in a cylinder 11 having a rectangular hollow section in accordance with the present invention (a square section could also be used) and which can for example be made in accordance with FIG. 1. The piston 12 is connected in the usual manner with a piston rod 13. Openings for the supply and extraction of a pressure medium, for example a hydraulic or pneumatic medium, designed and provided in known manner are not shown. The front end is closed by a cylinder cap 14 which is designed to suit the shape of the hollow section and incorporates a part 15 which projects into the interior of the hollow section. Part 15, the shape of which corresponds to the interior contour of cylinder 11, is sealed with respect to the latter by means of a quadrangular seal 16 which is designed as a continuous piece and inserted in a groove 17 over the entire periphery in part 15. For sealing piston 12 with respect to the cylinder, a quadrangular seal 16 is also provided which is inserted similarly in a piston groove around the entire periphery. The quadrangular seal in end cap 14 and is piston 12 can be of identical shape. Screw holes 19 (see also FIG. 4) are provided in face 18 in each of the corners for accommodating fixing screws 20 for attaching the cylinder cap 14 to the cylinder. A quadrangular ring representing a quadrangular seal is shown to a larger scale in FIG. 3: it can be seen that this quadrangular ring has a rectangular section and a rectangular contour.

In the form of construction shown in FIG. 4, the wall thickness of the wall regions 1, 3, 2 and 4 which are angularly adjacent is identical in each case. In the form of construction shown in FIG. 5, the shorter walls **3*a* have a greater wall thickness than the angularly adjacent walls 1 and 2. Through holes 20*a* with counterbores 21 are provided in the wall regions of greater wall thickness, and these holes are provided to accommodate fixing screws. By means of these fixing screws, the cylinder according to the present invention can be fastened to a level surface (not shown). By selecting wall thickness of different dimensions, one can thus provide for the fastening means to be accommodated in the cylinder wall itself, and therefore there are no projecting parts. It is of course also possible for walls 1 and 2 to be thicker than walls 3** if one prefers to use another type of fastening.

Clearly, it is readily possible to arrange several of the cylinders according to the present invention to be arranged both next to and also on top of each other. One can package the cylinders 25, 26, 27 in the manner shown in FIG. 6 for example, i.e. they can be grouped and assembled together to form one unit: since there is no interference due to projecting parts, the cylinders can be placed squarely alongside or on top of each other and they can be connected by means of screws inserted in the holes 20 and **20*a***.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A piston-cylinder module for fluid pressure media, comprising:

a cylinder formed from a quadrangularly-shaped, preformed imperforate hollow-sectioned material having quadrangularly-shaped inner and outer wall surfaces, the bore of said cylinder extending along the longitudinal axis of said hollow-sectioned material such that opposing wall members of said cylinder are parallel and have smooth outer surfaces, said cylinder including a longitudinally extending threaded hole in an end face thereof;

a cylinder cap including a projecting portion extending into said cylinder and a cover member forming a continuous external surface with the cylinder wall members, said projecting portion including a groove extending around the periphery thereof and a sealing member within said groove for sealing said cylinder bore, said cylinder cap further including a hole having a countersunk portion in the end surface thereof and aligned with said threaded hole receiving fastening means to be flush with said cap end surface and threadably engaging said threaded hole to secure said cylinder cap to said cylinder;

a wall of said cylinder further defining an enlarged wall section extending transverse to said longitudinal axis and including a laterally extending bore therein extending between the smooth outer surface of the opposing parallel wall members, said enlarged wall section including a countersunk portion on one surface thereof opening onto said laterally extending bore and being adapted for receiving means for fastening said cylinder to a mounting surface; and a quadrauqularly shaped piston within said cylinder bore and including a piston rod extending through the open end of said cylinder.

2. A piston-cylinder module comprising at least two piston-cylinder modules as set forth in claim 1 and wherein said at least two piston-cylinder modules are mounted in abutting relationship with their corresponding laterally extending bores being in aligned relationship and being attached to one another by fastening means extending through said laterally extending bores.

* * * * *